Oct. 25, 1938.   E. F. JUNGER   2,134,559
CREEPER FOR TRACTOR BELTS
Filed Dec. 20, 1937   2 Sheets-Sheet 1
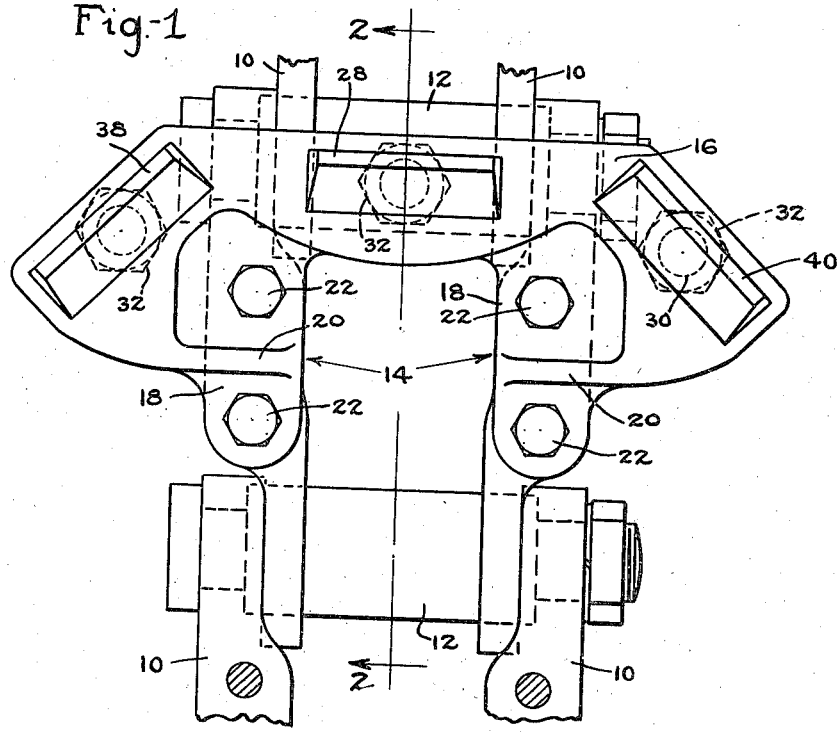
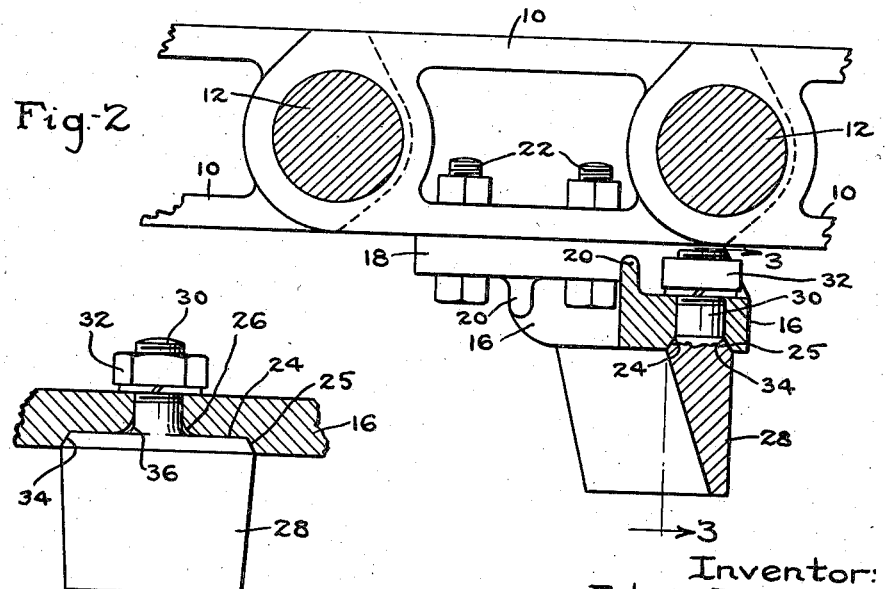
Inventor:
Edwin F Junger
By Whiteley and Ruckman
Attorneys.

Oct. 25, 1938.  E. F. JUNGER  2,134,559
CREEPER FOR TRACTOR BELTS
Filed Dec. 20, 1937  2 Sheets-Sheet 2
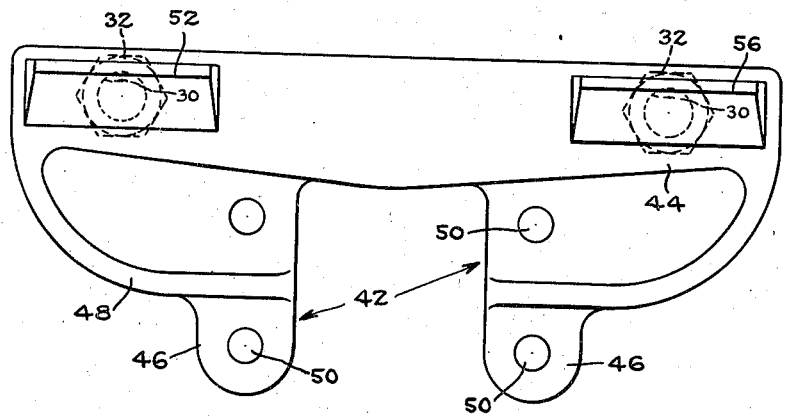
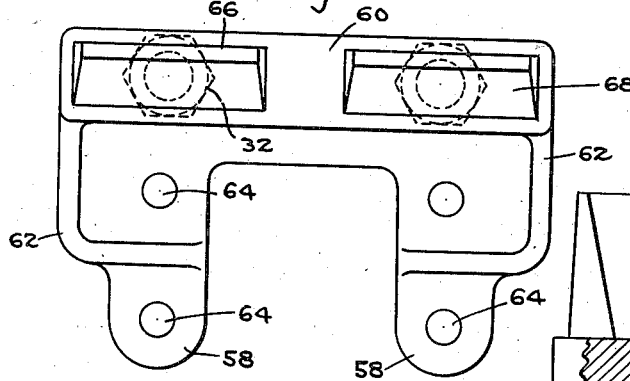
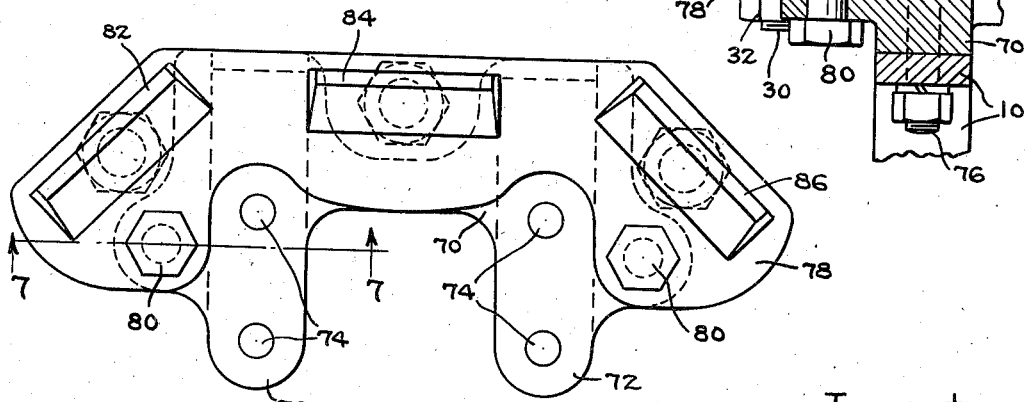
Inventor:
Edwin F. Junger.
By Whiteley and Ruckman
Attorneys.

Patented Oct. 25, 1938

2,134,559

UNITED STATES PATENT OFFICE 2,134,559

CREEPER FOR TRACTOR BELTS

Edwin F. Junger, Minneapolis, Minn.

Application December 20, 1937, Serial No. 180,795

2 Claims. (Cl. 305—10)

My invention relates to creepers for tractor belts, and an object in general is to provide a device of this character which is not only simple and cheap to manufacture, but is also very efficient in operation to prevent slipping and skidding when the tractor is running over ice and hard packed snow. Another object of the invention is to provide a creeper embodying a plurality of calks, all of which have provision for positively securing them in fixed position so that there will be no liability of the calks turning into a lesser effective position when the tractor is being used. Another object is to provide a construction arranged for securely attaching the calks so that they will not be liable to drop out but nevertheless will allow the calks to be readily removed whenever desired.

The full objects and advantages of my invention will appear in connection with the detailed description and the novel features of my inventive idea will be particularly pointed out in the claims.

In the accompanying drawings which illustrate some of the forms in which my invention may be embodied,—

Fig. 1 is a plan view of a concrete example of the invention applied to a tractor belt.

Fig. 2 is a view in central longitudinal section on the line 2—2 of Fig. 1.

Fig. 3 is a view of one of the calks on the line 3—3 of Fig. 2.

Fig. 4 is a plan view of a modified form of construction.

Fig. 5 is a plan view of another modified form of construction.

Fig. 6 is a plan view of still another modified form of construction.

Fig. 7 is a view in transverse section on the line 7—7 of Fig. 6.

My creeper is intended for attachment to an endless tractor belt of suitable construction which as indicated in Figs. 1 and 2 consists of a plurality of links 10 of which there are two sets spaced from each other and with the links respectively pivotally attached together by transverse pivot members 12. In the construction as shown in Figs. 1, 2 and 3, I provide a combined shoe and grouser device consisting of a shoe portion 14 and a grouser portion 16 which are constructed integrally. The shoe portion includes two plates 18 one for each end portion of the grouser and integral therewith and provided with strengthening ribs 20 connecting with the grouser portion 16 as will be understood from Fig. 1. Each plate 18 is provided with two holes through which are passed bolts 22 also passed through holes in the corresponding links 10 whereby the shoe portion is securely attached to the tractor belt. The outer surface of the grouser 16 as shown in Figs. 2 and 3 is provided with a central depression 24 which tapers inwardly as indicated at 25. From the inner wall of this depression a hole extends through the body of the grouser, the junction of this hole with the inner wall of the depression being rounded as indicated at 26. A calk 28 is provided with a screw threaded shank 30 which after being passed through the central hole in the grouser is secured in place by a nut 32. The inner portion of the calk 28 is tapered as indicated at 34 to correspond with or fit the taper at 25. The junction of the shank 30 with the calk 28 is in the form of a fillet 36 which is so curved as to leave a slight space between it and the rounded surface 26, thereby preventing binding at this place when the taper 34 is drawn into the taper 25. It will be noted from Fig. 2 that the calk 28 tapers outwardly so as to be of lesser thickness at its outer end, while from Fig. 3, it is apparent that the transverse dimension of the calk is materially greater than its thickness so that the calk extends transversely of the tractor belt as indicated in Fig. 1. From this figure, it is also apparent that the two lateral portions of the grouser are inclined and provided with calks 38 and 40 which are like the calk 28 and held in depressions similar to the depression 24 in the outer surface of the grouser. The difference is that the two calks 38 and 40 are set at angle with relation to a transverse line of the tractor belt so that they are inclined to the transverse calk 28. It will be understood that a plurality of these devices are secured around the tractor belt.

In the modification shown in Fig. 4, I employ a plurality of combined shoe and grouser devices each of which consists of a shoe portion 42 and a grouser portion 44. The shoe portion includes two plates 46 one for each end portion of the grouser and integral therewith and provided with strengthening ribs 48 connecting with the grouser portion 44. Each plate 46 is provided with two holes all designated 50 and through which are passed bolts similar to the bolts 22 for securing to the tractor belt. In this form of the invention, the grouser portion 44 instead of having inclined end portions extends straight across transversely. Two calks 52 and 56 are attached to the grouser in a manner to that already described, the difference being that the two calks as shown are aligned so as to extend straight across transversely of the tractor belt. This form of the invention may be used alone, or may be combined with the form shown in Fig. 5. The latter form shows a combined shoe and grouser device. The shoe portion includes two plates 58 one for each end portion of a grouser 60 and integral therewith and provided with strengthening ribs 62. Each plate 58 is provided with two holes all designated 64 and through which are passed bolts similar to the bolts 22 for securing to the tractor belt. In this case, the grouser 60 is shown considerably shorter than the grouser 44 and is provided with two depressions for receiving calks 66 and 68 in manner similar to that previously described. When this form of the invention is employed, it is preferably used in conjunction with the form shown in Fig. 4, the two forms being arranged in alternation around the tractor belt. As just indicated these two forms may be attached around the belt in spaced relation so that arranged in sequence, there will be first one form and then the other form and so on around the belt. It is to be noted however that the two calks 66 and 68 are so disposed that they will be positioned in staggered relation to the calks 52 and 54.

The form shown in Figs. 6 and 7 is similar to that shown in Figs. 1, 2 and 3, the main difference being that the shoe and grouser portions are constructed separately instead of integrally. As shown in Figs. 6 and 7, there is a shoe portion 70 having two plate members 72 each provided with two holes all designated 74. Bolts 76 are passed through these holes and through holes in the links 10 of the tractor belt. A grouser portion 78 is secured to the shoe portion 70 by bolts 80. The grouser 78 has three calks 82, 84 and 86 secured thereto with the same construction and arrangement described in detail in connection with Figs. 1, 2 and 3.

The operation and advantages of my invention will be readily understood in connection with the foregoing description and the accompanying drawings. Turning of the calks out of their most effective position is positively prevented and the calks are very firmly secured in place by providing the outer surface of the grouser with inwardly tapered depressions into which the tapered margins of the calks are drawn by force applied to the shanks of the calks. The device is of particular utility for attachment to tractors of the track laying type when used for clearing heavy snow and ice from streets and highways. The calks may be readily removed when it is not desired to use them in connection with tractors which are being run over surfaces which are not slippery. The calks may also be readily removed for replacement purposes.

I claim:

1. A creeper for tractor belts comprising a shoe, means for detachably securing said shoe to the belt, a grouser carried by the shoe, the outer surface of said grouser being provided with inwardly tapered depressions and the body of the grouser being provided with holes which extend inwardly from the respective depressions, the outer margins of said holes being rounded, calks having inner margins tapered to fit said tapered depressions, shanks carried by the inner surfaces of said calks and extending respectively through said holes, fillets on said shanks at the junction thereof with said calks, said fillets being so curved as to leave a slight space between them and said rounded margins, and means for applying force to said shanks to draw the tapered margins of said calks into engagement with the tapered surfaces of said depressions and to detachably secure said shanks in said holes.

2. A creeper for tractor belts comprising a shoe, means for detachably securing said shoe to the belt, a grouser carried by the shoe, the outer surface of said grouser being provided with inwardly tapered depressions and the body of the grouser being provided with holes which extend inwardly from the respective depressions, said depressions including a central elongated depression extending transversely with relation to the belt and including elongated depressions in the lateral portions of the grouser extending at an angle with relation to a transverse line of the belt, calks having inner margins tapered to fit said tapered depressions, shanks carried by the inner surfaces of said calks and extending respectively through said holes, and means for applying force to said shanks to draw the tapered surfaces of said calks into engagement with the tapered surfaces of said depressions and to detachably secure said shanks in said holes.

EDWIN F. JUNGER.